UNITED STATES PATENT OFFICE.

HEINRICH OSTER, OF CHARLOTTENBURG, GERMANY, ASSIGNOR TO ACTIEN GESELLSCHAFT FÜR ANILIN FABRIKATION, OF BERLIN, GERMANY.

AZO DYE FOR CHROMED WOOL AND PROCESS OF MAKING SAME.

949,633.     Specification of Letters Patent.     Patented Feb. 15, 1910.

No Drawing.     Application filed October 21, 1909. Serial No. 523,806.

*To all whom it may concern:*

Be it known that I, HEINRICH OSTER, a subject of the German Empire, residing at Charlottenburg 2, near Berlin, Germany, (my post-office address being Guerickestrasse 14, Charlottenburg 2, near Berlin,) have invented certain new and useful Improvements in New Azo Dyestuffs for Chrome-Mordanted Wool and Process of Making Same, of which the following is a specification.

My invention relates to the manufacture of new azo-dyestuffs which are especially adapted for chrome-mordanted wool and may be obtained by diazotizing 2.5-dichloroanilin-4-sulfonic acid and combining the diazo-compound thus obtained with an aromatic ortho-oxy-carboxylic acid, such as for instance salicylic acid or ortho-cresotinic acid. The dyestuffs thus manufactured produce on wool in combination with a suitable chrome-mordant orange to red tints which possess a good fastness and a full shade overhand.

The following example serves to illustrate my invention, the parts being by weight:

Example: 26.4 parts of the sodium salt of 2.5-dichloro-anilin-4-sulfonic acid are diazotized in the usual manner by means of 50 parts of hydrochloric acid of 12° Bé. specific gravity and 7 parts of sodium nitrite. The diazo-solution thus obtained is allowed to run while stirring into an aqueous solution of salicylic acid prepared from 14 parts of this acid with the addition of 27.3 parts of calcined sodium carbonate. The combination being finished the dyestuff is precipitated by the addition of common salt, drained and dried. It is thus obtained in the shape of an orange powder when pulverized, which may be dyed on wool from a dye-bath containing Glauber salt and acetic acid, sulfuric acid being added after having boiled for some time, whereupon potassium bichromate is added in order to develop the color. Thus is produced a deep and clear orange tint with a full shade overhand and possessing a good fastness.

The new dyestuff as above obtained dissolves in water to a yellow to orange solution which on the addition of concentrated hydrochloric acid yields a yellow jelly, whereas by the addition of concentrated caustic soda-lye or of concentrated liquor ammoniæ the solution assumes a deep red color; addition of glacial acetic acid turns the color of the aqueous solution to yellow without separating a precipitate. The new dyestuff dissolves in alcohol to a reddish yellow to orange solution but is insoluble in benzene; in concentrated sulfuric acid it dissolves to an orange-red solution which on the addition of ice separates yellow flakes. The aqueous solution of the dyestuff is decolorized at ordinary temperature by the addition of stannous chlorid and hydrochloric acid, the dyestuff thus being split up, yielding 2.5-dichloroanilin-4-sulfonic acid besides para-aminosalicylic acid.

It is obvious to those skilled in the art that my present invention is not limited to the foregoing example or to the details given therein. It may be stated, for instance, that if ortho-cresotinic acid is substituted for the salicylic acid, used in the foregoing example, and if the conditions of the reaction are altered accordingly, a dyestuff is obtained which in its physical and chemical qualities resembles much the dyestuff of the foregoing example; it produces on wool in combination with a subsequent treatment with oxidizing chromium compounds tints which are a little more reddish than the tints of the dyestuff derived from salicylic acid.

Having now described the invention and the manner in which it may be performed what I claim is,—

1. As new articles of manufacture the hereinbefore described new azo-dyestuffs which may be obtained by diazotizing 2.5-dichloro-anilin-4-sulfonic acid and combining the diazo-compound thus obtained with an aromatic ortho-oxy-carboxylic acid, these new dyestuffs producing on wool from an acid bath with a subsequent treatment of oxidizing chromium compounds deep and clear orange to red shades with a full shade overhand, which new dyestuffs when pulverized are yellow to orange powders soluble in water to a yellow to orange solution which on the addition of a mineral acid separates the free acid of the dyestuff, whereas addition of a caustic alkali changes the color of the solution to deep red, and which new coloring matters are soluble in concentrated sulfuric acid to orange-red solutions from which solutions on the addition of ice the free acid of the dyestuffs separates.

2. As a new article of manufacture the hereinbefore-described new azo-dyestuff, which may be obtained by diazotizing 2.5-dichloroanilin-4-sulfonic acid and combining the diazo-compound thus obtained with salicylic acid, which new dyestuff produces on wool, when dyed from a dye-bath containing Glauber salt and acetic acid, sulfuric acid being added after having boiled for some time, and then potassium bichromate being added in order to develop the color, a deep and clear orange tint with a full shade overhand, this new coloring matter dissolving in water to a yellow to orange solution, which solution on the addition of concentrated hydrochloric acid yields a yellow jelly, whereas by the addition of concentrated caustic soda-lye or of concentrated liquor ammoniæ the solution assumes a deep red color and whereas the addition of glacial acetic acid turns the color of the solution to yellow, this new dyestuff dissolving in alcohol to a reddish-yellow to orange solution and being insoluble in benzene, and this new coloring matter dissolving in concentrated sulfuric acid to an orange-red solution which on the addition of ice separates yellow flakes, an aqueous solution of this dyestuff being decolorized at ordinary temperature by the addition of stannous chlorid and hydrochloric acid, the dyestuff being split up yielding thus 2.5-dichloro-anilin-4-sulfonic acid besides para-amidosalicylic acid.

In testimony whereof I have hereunto set my hand in presence of two subscribing witnesses.

HEINRICH OSTER.

Witnesses:
HENRY HASPER,
WOLDEMAR HAUPT.